United States Patent
Preska et al.

(10) Patent No.: US 6,240,324 B1
(45) Date of Patent: *May 29, 2001

(54) ADAPTIVE CASCADE CONTROL ALGORITHM

(75) Inventors: William Kennedy Preska, Woodbury; Gary A. Smith, Plymouth, both of MN (US)

(73) Assignee: Honeywell International Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,062

(22) Filed: Jul. 31, 1997

(51) Int. Cl.[7] .............................. G05B 11/01; G05B 13/02
(52) U.S. Cl. ................................. 700/8; 700/33; 700/34
(58) Field of Search ............................... 700/33, 34, 35, 700/36, 77, 8, 40, 54

(56) References Cited

U.S. PATENT DOCUMENTS

| | | | |
|---|---|---|---|
| 3,152,602 | * 10/1964 | Hackman | 137/487.5 |
| 3,719,809 | * 3/1973 | Fink | 307/57 |
| 4,059,745 | * 11/1977 | Gaertner | 364/153 |
| 4,143,415 | * 3/1979 | Klingbell | 364/105 |
| 4,151,589 | * 4/1979 | Ross | 364/137 |
| 4,418,381 | * 11/1983 | Molusis et al. | 364/131 |
| 5,200,681 | * 4/1993 | Hiroi | 318/610 |
| 5,291,190 | * 3/1994 | Scarola et al. | 340/825.06 |
| 5,329,443 | * 7/1994 | Bonaquist et al. | 700/33 |
| 5,457,625 | * 10/1995 | Lim et al. | 700/29 |
| 5,572,420 | * 11/1996 | Lu | 700/33 |
| 5,574,638 | * 11/1996 | Lu | 364/165 |
| 5,697,436 | * 12/1997 | Johnson et al. | 165/254 |
| 5,742,503 | * 4/1998 | Yu | 700/42 |
| 5,812,428 | * 9/1998 | Zou et al. | 318/561 |
| 5,818,714 | * 10/1998 | Zou et al. | 364/157 |

FOREIGN PATENT DOCUMENTS

0710901A * 1/1995 (EP).

* cited by examiner

Primary Examiner—Paul P. Gordon
(74) Attorney, Agent, or Firm—Robert B. Leonard

(57) ABSTRACT

A process for performing real-time cascade control for use in controllers. An adaptive process module uses an algorithm to set parameters during system operation to attain the best possible control performance, while providing an easier-to-use system for the user. The algorithm uses a novel adaptive technique to intelligently adjust the minimum and maximum allowable controlled-variable set point limits, under varying load conditions.

3 Claims, 4 Drawing Sheets

ADAPTIVE CASCADE CONTROL ALGORITHM

BACKGROUND OF THE INVENTION

The present invention relates to the field of controllers, and more specifically to cascaded controllers.

The purpose of cascade control has been to provide superior control of a process through continuous controlled-medium set point adjustments. As shown in Prior Art FIG. 1, "Classic" cascade control was usually defined as a control method where the output from one control module 10 was fed into the set point input of another control module 30, passing through some scaling module 20 on the way. These functions were typically implemented using a Direct Digital Control (DDC) controller. In a DDC controller, the control modules were usually PID operators, or functions and the scaling module was typically a ratio operator.

The purpose of the scaling module was to transform the output from the first PID operator (typically ranging from 0 to 100%) into a usable set point appropriate for the controlled medium (i.e., air temperature, air pressure, water temperature, etc.). A direct linear relationship was commonly used, such as that provided by a standard ratio operator.

The problem with classic cascade control was that the system installer or end-user rarely knew what values to enter into the minimum and maximum set point limit parameters (inputs 21 and 22 into the scaling module 20) to achieve optimal control of the process. In fact, installers or end users often picked values which led to poor system operation. Also, as system (process) gains change, due to different load levels, seasonal loads, etc., the optimum values of limit parameters may change.

Accordingly, it is an object of the invention to provide installers and end users of cascaded controls with systems which have fewer parameters to be entered by them leading to reduced installation time and consequently, better performance.

SUMMARY OF THE INVENTION

The present invention is an apparatus and a process for adaptive cascade control. An adaptive process module intelligently sets parameters during system operation to attain the best possible control performance, while providing an easier-to-use system for the user.

The process includes the steps of determining whether the measured variable has a first predetermined relationship with a MINLIMIT and if so, lowering the value of the MINLIMIT, determining whether the measured variable cannot reach the MINLIMIT with the controller output ON full and if so, raising the value of the MINLIMIT, determine whether the measured variable cannot reach a MAXLIMIT with the controller output OFF and if so, lowering the value of the MAXLIMIT and determining whether the measured variable has second predetermined relationship with the MAXLIMIT and if so, raising the value of the MAXLIMIT.

Implementing this new control results in a control system with fewer parameters which must be configured by the installer or operator. Further, the parameters which are removed from the operator's access are ones which are difficult to set to correct values, and the correct values may change depending on seasonal, or other load differences which affect process dynamics. Therefore, the new algorithm saves installation and set-up time, as well as providing on-going ease-of-use for the operator.

DETAILED DESCRIPTION OF THE PREFERRED EMBODIMENT

Figure 2:
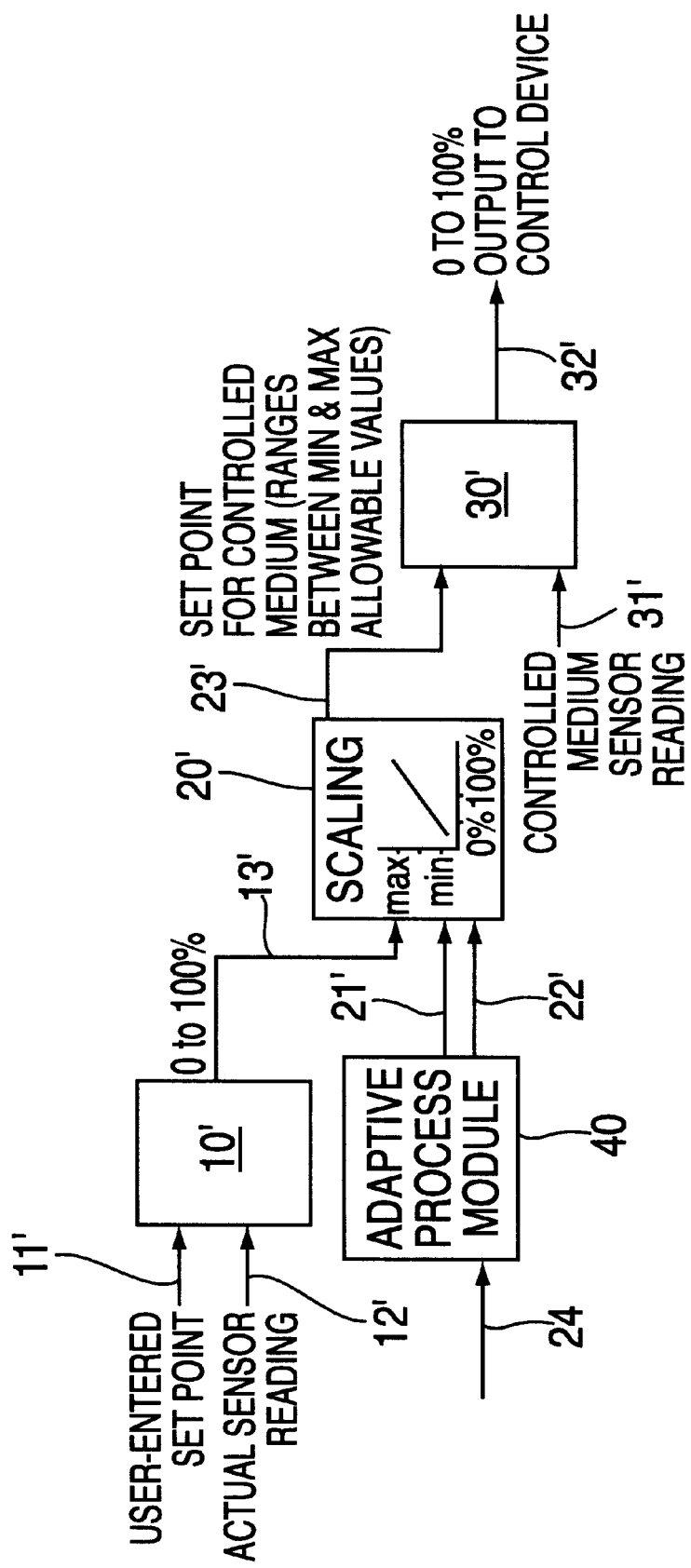
FIG. 2 is a block diagram of a cascaded control using the present invention.

Referring now to FIG. 2, thereshown is a block diagram of an adaptive cascade control system. The system includes first control module 10', scaling module 20', adaptive process module 40 and second control module 30'. First control module 10' receives a user entered setpoint and an actual sensor reading as inputs at terminals 11' and 12'. The first control module, which may be a PID controller produces a first output signal based upon the programming of the controller. The first output signal is sent to the scaling module 20' at terminal 13'. Note that for the present invention, the details of the programming of the first and second control modules are not important so long as the signal the control module produces is representative of the difference between the input signals to the module.

The scaling module 20' then multiplies the first output by a scaling factor which is determined as a function of MAXLIMIT and MINLIMIT. This produces a second output signal. In a preferred embodiment, the scaling factor is a linear function of the MAXLIMIT and the MINLIMIT. MAXLIMIT and MINLIMIT are set by the adaptive process module.

The adaptive control module is connected to the scaling module and receives a controlled medium sensor reading at terminal 24. Through the process described below in connection with FIG. 3, the adaptive control module produces updated MAXLIMIT and MINLIMIT values which are supplied to the scaling module at terminals 21' and 22'. The scaling module then modifies the curve used to produce the second output based upon the new MAXLIMIT and MINLIMIT.

The second control module 30' receives the second output signal and the controlled medium sensor reading at its terminals 23' and 31' respectively. The second control module produces a third output signal which is representative of the difference between the inputs to the module. This third output signal is sent to the control device.

Figure 1:
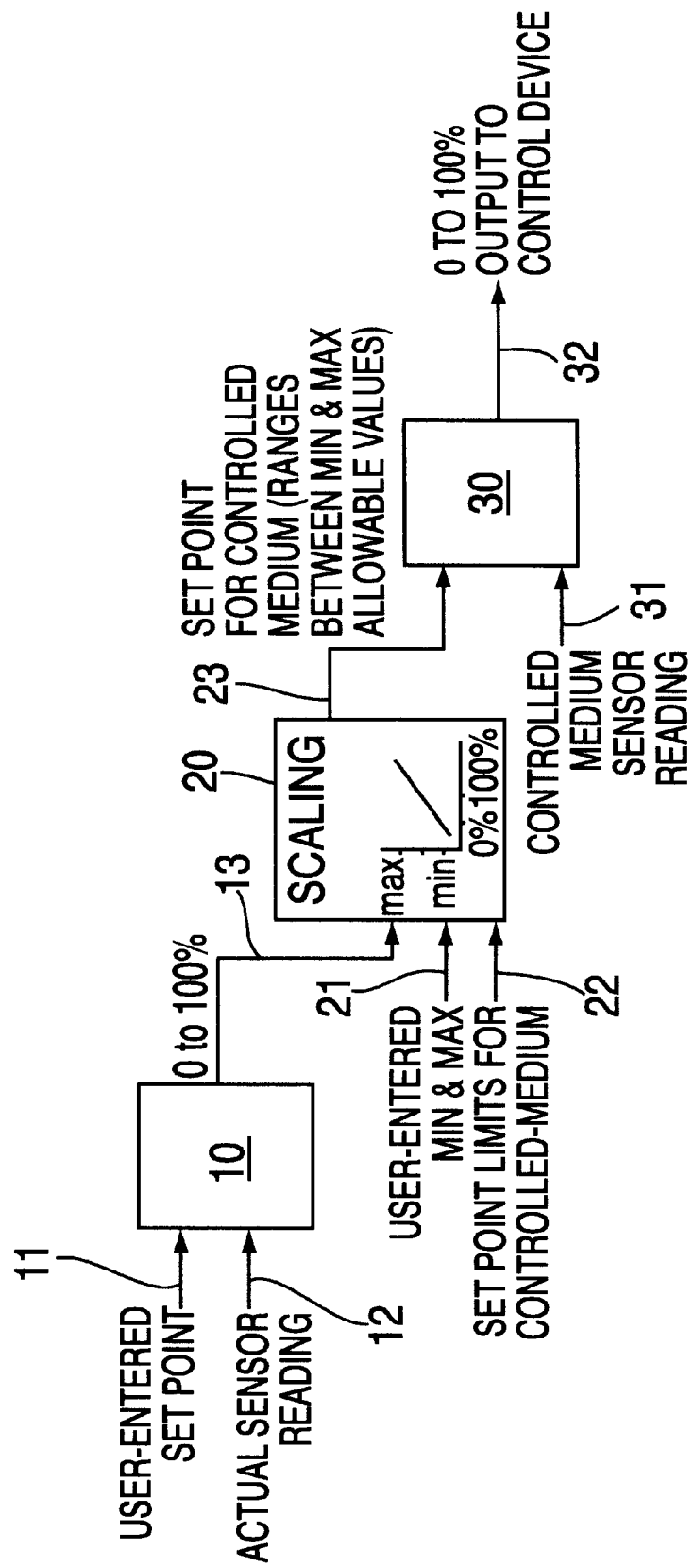
FIG. 1 is a block diagram of a prior art cascade control.

The Adaptive Cascade Control Algorithm operates to provide the Scaling Module updated MAXLIMIT and MINLIMIT values. In FIG. 2, note that the user-entered minimum and maximum set point limit parameters (shown in FIG. 1) are no longer required.

The core concept behind the Adaptive Algorithm is to monitor the controlled variable over time and through changes in load conditions, and watch for it's first and second limit values. In a preferred embodiment, the first and second limit values are maximum and minimum attainable values. This information is then used to set the maximum and minimum limits (MAXLIMIT and MINLIMIT) on the controlled variable's set point. In classic cascade control (FIG. 1), the limit values are frequently not set correctly (a manual operation), and the controller is then not be able to achieve optimum performance due to the set point being commanded to an inappropriate value. The Adaptive Algorithm computes the correct values for these limit parameters, and thereby keeps the controller working at peak efficiency.

The Algorithm essentially checks four cases to see if the minimum or maximum set point limits needed adjusting. These four cases, along with a description of the Algorithm's corrective actions are described in table 1.

The Algorithm uses an interval timer to check out the four possible cases every "interval time" period. Typical values for the interval time for an HVAC Discharge Air Temperature control application are 7 to 10 minutes.

TABLE 1

| Triggering Condition | The Algorithm's Response |
| --- | --- |
| Case 1 (minimum set point) - The measured variable has gone below the MINLIMIT. | Lower the value of the MINLIMIT |
| Case 2 (minimum set point) - The measured variable cannot reach the MINLIMIT, even with the output ON full (for a Direct-Acting controller - see Note in figure 3). | Raise the value of the MINLIMIT. |
| Case 3 (maximum set point) - The measured variable cannot reach the MAXLIMIT, even with the output OFF (for a Direct-Acting controller - see Note in figure 3). | Lower the value of the MAXLIMIT |
| Case 4 (maximum set point) - The measured variable has gone above the MAXLIMIT. | Raise the value of the MAXLIMIT |

Figure 3:
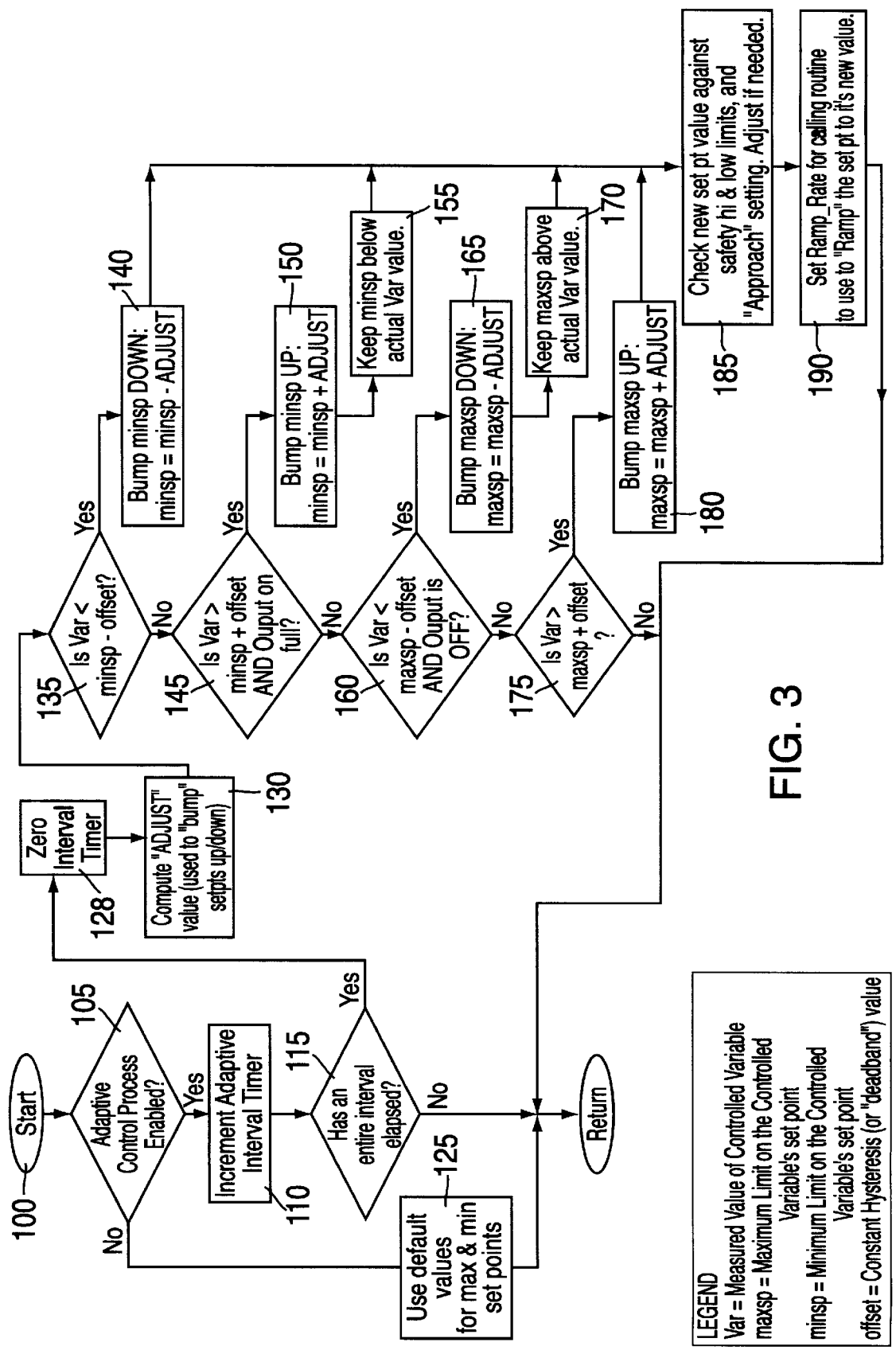
FIG. 3 is a flow chart of the presently inventive method.

The way the algorithm works internally to check these four cases is illustrated in the flowchart shown in FIG. 3. The amount by which the minimum and maximum set point limits are raised or lowered (as mentioned in Table 1) is determined by the value of the "ADJUST" variable. This is discussed further below.

In a preferred embodiment, the algorithm may place constraints on MINLIMIT and MAXLIMIT such that there are absolute low and high limits that are not exceeded. For example in a cooling system, for safety and/or comfort reasons, the discharge temperature must be kept from getting too low and causing a cold draft, or potentially freezing a coil. Also, there is an approach limit to keep the MINLIMIT and MAXLIMIT from getting too close together. Referring now to FIG. 3, thereshown is a preferred embodiment of the adaptive control process. Note that the process described below is for a so called "direct acting" control system such as a discharge air cooling control. The process with only minor adjustments, can also be implemented for use with a reverse acting control system.

After starting at block 100, the process determines whether the adaptive control process is enabled at block 105. If not, the process moves to block 125 where default values for MAXLIMIT and MINLIMIT are used and the process goes into a wait mode at block 120. After a user defined wait period, the process restarts at block 100. In a preferred embodiment, this period is ten seconds. However, this period is application specific.

If the adaptive control process is enabled, an adaptive interval timer is incremented at block 110. Next, the process determines at block 115 whether the current adaptive control interval has elapsed. If not, the process goes into wait mode at block 120. If so, the process moves into block 128 where the interval timer is reset to zero. Then, the process moves into the Adjust Value section at block 130. This process is used to adjust MAXLIMIT and MINLIMIT for changing load conditions.

At block 135, VAR, which is the measured value of the controlled variable, is compared to the difference between MINLIMIT and the OFFSET. OFFSET represents a deadband range whose value is a matter of design choice. The OFFSET is included to include switching hysteresis. If VAR is greater than the difference, the process moves on to block 145. If VAR is less than the difference, then MINLIMIT is set equal to MINLIMIT minus ADJUST. The description of how to calculate ADJUST appears below. Upon calculation of the new MINLIMIT, the process then moves on to block 185.

At block 145, the VAR is compared to the sum of MINLIMIT and OFFSET and determines whether the system is running at full output. If VAR is less than the sum or the system is not running at full output, the process moves to block 160. If VAR is greater than the sum and the system is at full output, the process at block 150 calculates a new MINLIMIT which is equal to MINLIMIT plus ADJUST. At block 155, the process then ensures that MINLIMIT is maintained below the VAR value. If MINLIMIT would exceed the VAR value, it is then set equal to the VAR value by the process. This ensures that the addition of the ADJUST value does not cause the new MINLIMIT to be above the current operating point of the system(VAR). The process then moves to block 185.

At block 160, the process compares VAR to the difference between MAXLIMIT and OFFSET and determines whether the system is off. If VAR is greater than the difference or the system is not off, the process moves to block 175. If VAR is less than the difference and the system is off, the process at block 165 calculates a new MAXLIMIT which is equal to MAXLIMIT minus ADJUST. At block 170, the process ensures that MAXLIMIT is maintained above the VAR value and then moves to block 185.. If MAXLIMIT would go below the VAR value, it is then set equal to the VAR value by the process. This ensures that the subtraction of the ADJUST value does not cause the new MAXLIMIT to be below the current operating point of the system(VAR).

At block 175, the process compares VAR to the sum of MAXLIMIT and OFFSET. If VAR is less than the sum, the process moves to block 120. If VAR is greater than the sum, the process at block 180 calculates a new MAXLIMIT which is equal to MAXLIMIT plus ADJUST. The process then moves to block 185.

At block 185, the process compares the calculated new MAXLIMIT and/or MINLIMIT against absolute hi and low limits. The absolute hi and low limits are End-User selected values that have default values which correspond to a specific application. They may be based on comfort, equipment safety, or other criteria. The default values allow operation of the controller without user modification in most cases. Typical values: for a discharge air temperature controller, the absolute low limit may be 45 DegF, and the high limit might be 110 degF. The process also checks the new MAXLIMIT and/or MINLIMIT against the Approach setting. The Approach Limit ensures that the MINLIMIT and MAXLIMIT do not get too close together and cause possible control hunting or instability. The selection of an Approach Limit value is application specific. For example, in discharge air temperature control for space comfort cooling, the controlled device range (from 0% to 100% of the control output signal) will typically cause an approximately 20 DegF change in the discharge air temperature. The size of this range varies with air flow, outdoor air temperature and humidity, etc. The Approach Limit should be chosen to be less than about 40% of the smallest expected temperature range. Yet, if the Approach value is too small, the calculation of the setpoint value will not have enough resolution to maintain stable control, so keep the value greater than roughly 25% of the smallest expected temperature range. The Approach Limit would typically be hard-coded into the product by the control designer who has the application specific knowledge. However, for a general purpose controller, the Approach Limit could be a user-settable value. As an example, if the smallest expected range of discharge air temperatures is 50 to 70 DegF (a range of 20 DegF), then the Approach Limit should be set to roughly 5 to 8 DegF (25 to 40% of 20 DegF).].

Next, the process moves to block 190 where a RAMP RATE is set. The RAMP RATE is used to adjust the new MAXLIMIT or MINLIMIT to its new value over time. By way of example, if the old minimum setpoint limit was 52 DegF, and the process calculates a new desired limit value of 50 DegF, the setpoint will "ramp" down to 50 over the time elapsed between Adaptive Cascade Control calculations. This time between calculations is controlled by the "Adaptive Interval Timer" (shown in blocks 110 and 115 of FIG. 3). For the discharge air temperature control application, the Interval Time was hard-coded to approximately 8 minutes. Therefore the ramp rate is ⅜, or 0.25 DegF/min.] The process then returns to block 120.

In FIG. 3, the block labeled "Compute ADJUST value" calculates the amount by which the set points are to be changed, either up or down, each interval. There are a variety of ways to implement the "Compute ADJUST value" block. The method applied here uses the current difference value between the measured controlled variable ("VAR" in FIG. 3) and it's set point. This difference is referred to as the proportional error value.

Using the proportional error as the amount by which the set point limits are adjusted provides the benefit of fast, stable response to changes in load conditions. If the system is currently far away from set point, the set-point-limit adjustment amount is large (to provide fast response). Whereas, the adjustments are small when running near the set point (to provide stability).

ADJUST can be calculated as follows. The ADJUST Value is calculated in several different ways, depending on where the measured value of the controlled variable lies at the time an adjustment is needed. There are two operational scenarios, as described in each case below: First, the set point is currently at either the minimum or maximum set point limit. In this case, the ADJUST Value is a multiple of the "proportional error" value of the primary variable (i.e., for the discharge temperature control application, this is the difference between the zone air temperature sensor and it's set point). Second, the set point is currently in between the minimum or maximum set point limits. In this case, the ADJUST Value is a multiple of the "proportional error" value of the secondary variable (i.e., for the discharge temperature control application, this is the difference between the discharge air temperature sensor and it's set point).

For the discharge air temperature control application, the "multiple" value used in Case 1 is 3.0 for Cooling operation, and 2.0 for Heating operation. The multiple used in Case 2 is 1.0 for both Cooling and Heating.

The following table summarizes the ADJUST Value calculation method as implemented in the discharge control application:

| Location of Secondary (Controlled) Variable | Resulting ADJUST Value |
| --- | --- |
| Cool Mode: DAT At MINLIMIT | ADJUST = 3*ZAT_prop_err |
| Cool Mode: DAT Can't Reach MINLIMIT | ADJUST = DAT_prop_err |
| Cool Mode: DAT At MAXLIMIT | ADJUST = 3*ZAT_prop_err |
| Cool Mode: DAT Can't Reach MAXLIMIT | ADJUST = DAT_prop_err |
| Heat Mode: DAT At MIN_SETPOINT | ADJUST = 2*ZAT_prop_err |
| Heat Mode: DAT Can't Reach MINLIMIT | ADJUST = DAT_prop_err |
| Heat Mode: DAT At MAXLIMIT | ADJUST = 2*ZAT_prop_err |
| Heat Mode: DAT Can't Reach MAXLIMIT | ADJUST = DAT_prop_err |

Definitions:
DAT = Discharge Air Temperature, ZAT = Zone Air Temperature
prop_err = Proportional Error, which is the difference between a measured variable and it's set point.
Primary Variable = The variable to be maintained at set point by the control system, although the controller has only indirect control over this variable (i.e., space or "zone" temperature).
Secondary Variable = The variable which the control system directly controls, and which affects the Primary (i.e., discharge air temperature).

This table shows the same information for a generic control application:

| Location of Secondary (Controlled) Variable | Resulting ADJUST Value |
| --- | --- |
| Secondary VAR At MINLIMIT | ADJUST = X*(Primary VAR - Primary Set Pt) |
| Secondary VAR Can't Reach MINLIMIT | ADJUST = Y*(Secondary VAR - Sec. Set Pt) |
| Secondary VAR At MAXLIMIT | ADJUST = X*(Primary VAR - Primary Set Pt) |
| Secondary VAR Can't Reach MAXLIMIT | ADJUST = Y*(Secondary VAR - Sec. Set Pt) |

For the discharge air control example:
X = 3.0 when cooling
X = 2.0 when heating
Y = 1.0 always.

Another option for how to implement the "Compute ADJUST value" block is to use some constant value which can be experimentally determined, or set by the user. Other options exist as well.

In order to further speed the response to load changes, the algorithm can also use a scaling value (such as 2.0 or 3.0) multiplied by the proportional error adjustment amount. When broadening the allowable set point range (i.e., lowering the MINLIMIT, or raising the MAXLIMIT), the ADJUST value can be, say, doubled, and then applied to the current set point limit. This lets the system under control get back to set point quickly.

Controllers utilizing this algorithm could be constructed to control a wide variety of industrial equipment and processes. The algorithm has been validated through implementation in an HVAC-equipment controller, upon which many simulation studies have been performed. As mentioned above, the discharge air control application is one possible use of the adaptive cascade control described herein. Such a system is shown in FIG. 4.

Figure 4:
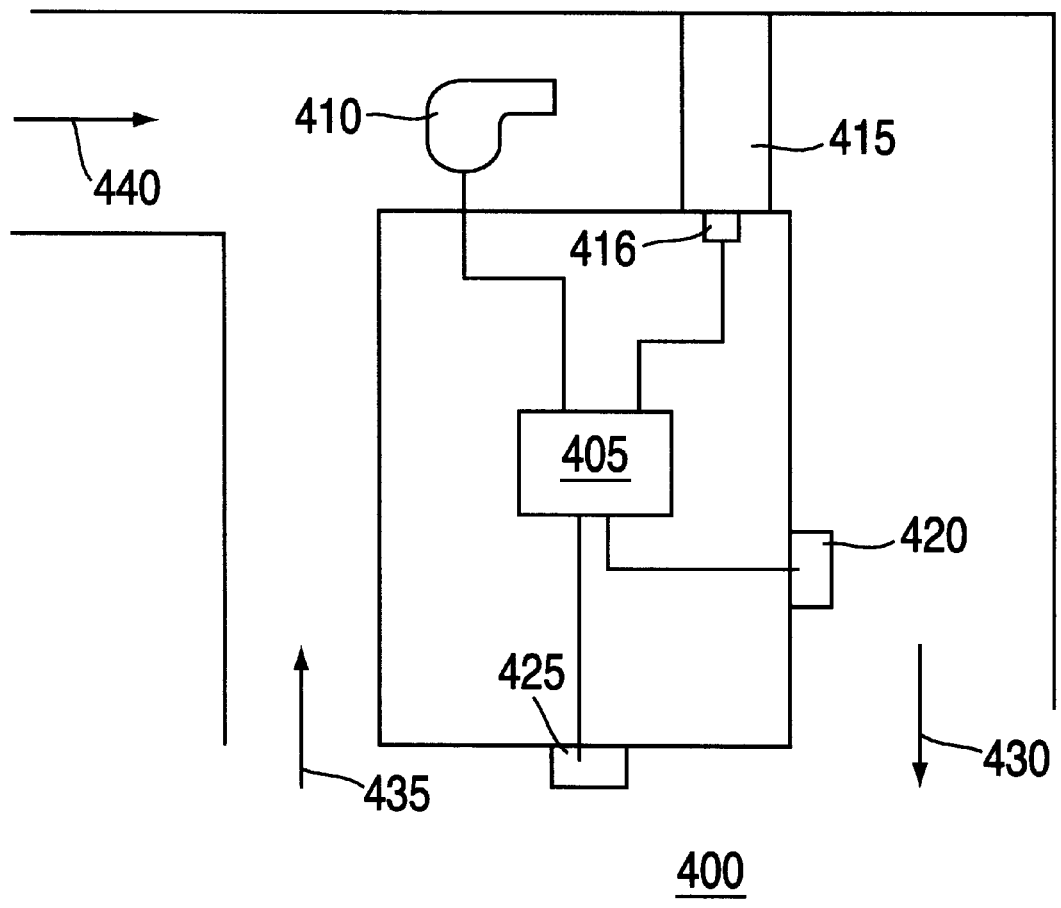
FIG. 4 is a block diagram of an HVAC system having a controller which includes the inventive apparatus and process.

In FIG. 4, a controller 405 is the main control for ensuring that the temperature in space 400 is as desired. Controller 405 is connected to a fan 410, an exchange unit 415, a valve 416, a discharge air temperature unit 420, and a space temperature sensor 425. Outside air 440 and return air 435 are combined and moved by fan 410 to create discharge air 430. In operation, the temperature sensor 425 measures the temperature in space 400. This temperature is communicated to controller 405. Controller 405, which includes a processor, memory and a communications interface as is well known in the art, receives the temperature information and implements control module 10' using a user entered setpoint and the temperature information as the actual sensor reading. The controller then implements the scaling module 20' and the second control module 30' to produce the third output signal. The adaptive process module 40 is implemented by the controller at predetermined intervals as defined above. Both the adaptive process module and the second control module receive a controlled medium sensor reading from discharge air temperature unit 420.

The third output signal is sent to the valve 416 to control the flow of process fluid (not shown) through the exchange unit 415. The exchange unit 415 may be an expansion coil or a heat exchanger. The valve is openable to plural positions in response to the third output signal. By controlling the flow through the exchange unit, the temperature of the air passing through the exchange unit is varied.

The foregoing has been a description of a useful, novel and non-obvious adaptive cascade control. By implementing the adaptive cascade control, better control of the controlled system is achieved over varying load conditions with less input required by the user. The inventors have provided this written description as an example, not a limitation and define the limits of their invention through the claims below.

We claim:

1. In a process controller where an output signal of a first controller is used as an input signal to a second controller where input to the second controller has a maximum limit (MAXLIMIT) and a minimum limit (MINLIMIT), an improved method for cascade control, comprising the steps of:

inputting a measured variable to the first controller;

determining whether the measured variable has a first predetermined relationship with the MINLIMIT and if so, lowering the value of the MINLIMIT;

determining whether the measured variable cannot reach the MINLIMIT with the controller output ON full and if so, raising the value of the MINLIMIT;

determining whether the measured variable cannot reach the MAXLIMIT with the controller output OFF and if so, lowering the value of the MAXLIMIT; and determining whether the measured variable has second predetermined relationship with the MAXLIMIT and if so, raising the value of the MAXLIMIT, wherein the first controller and the second controller cooperate so that the second controller produces an output signal in a range limited by MAXLIMIT and MINLIMIT values that are continuously recalculated.

2. An adaptive process module for use in a cascaded control system, the cascaded control system controlling a measured variable, the adaptive process module being connected to a controlled medium sensor and connected between a first controller and a second controller and comprising:

a processor;

a memory for storing instructions for the processor, the memory causing the processor to receive a controlled medium sensor signal from the controlled medium sensor and a first output signal from the first controller and producing a second output signal, the memory storing instructions causing the processor to determine whether the measured variable has a first predetermined relationship with a minimum limit (MINLIMIT) and if so, lowering the value of the MINLIMIT, determine whether the measured variable cannot reach the MINLIMIT with the controller output ON full and if so, raising the value of the MINLIMIT, determine whether the measured variable cannot reach a maximum limit (MAXLIMIT) with the controller output OFF and if so, lowering the value of the MAXLIMIT and determine whether the measured variable has second predetermined relationship with the MAXLIMIT and if so, raising the value of the MAXLIMIT, wherein the first controller and the second controller cooperate so that the second controller produces an output signal in a range limited by MAXLIMIT and MINLIMIT values that are continuously recalculated.

3. An adaptive cascade control for controlling a measured variable, the adaptive cascade control receiving a measured variable temperature signal, the control comprising:

a scaling module producing an output signal as a function of a control input signal and a maximum limit (MAXLIMIT) value and a minimum limit (MINLIMIT) value;

an adaptive process module connected to the scaling module, the adaptive process module being adapted to determine whether the measured variable has a first predetermined relationship with the MINLIMIT and if so, lowering the value of the MINLIMIT, determine whether the measured variable cannot reach the MINLIMIT with a controller output ON full and if so, raising the value of the MINLIMIT, determine whether the measured variable cannot reach the MAXLIMIT with the controller output OFF and if so, lowering the value of the MAXLIMIT and determine whether the measured variable has second predetermined relationship with the MAXLIMIT and if so, raising the value of the MAXLIMIT, wherein the adaptive process module continuously operates to recalculate the values of MAXLIMIT and MINLIMIT.

* * * * *